United States Patent
Tsunooka (10) Patent No.: US 9,890,718 B2
(45) Date of Patent: Feb. 13, 2018

(54) CONTROL APPARATUS FOR INTERNAL COMBUSTION ENGINE

(75) Inventor: Takashi Tsunooka, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 332 days.

(21) Appl. No.: 14/363,034

(22) PCT Filed: Jan. 11, 2012

(86) PCT No.: PCT/JP2012/050360
§ 371 (c)(1),
(2), (4) Date: Jun. 5, 2014

(87) PCT Pub. No.: WO2013/105226
PCT Pub. Date: Jul. 18, 2013

(65) Prior Publication Data
US 2014/0325983 A1 Nov. 6, 2014

(51) Int. Cl.
*F02D 41/00* (2006.01)
*F02D 41/02* (2006.01)
(Continued)

(52) U.S. Cl.
CPC .......... *F02D 41/0007* (2013.01); *F01N 9/00* (2013.01); *F02B 37/16* (2013.01); *F02B 37/18* (2013.01);
(Continued)

(58) Field of Classification Search
CPC ........ F02D 41/0007; F02D 9/02; F02D 23/00; F02D 41/024; F02D 67/02; F02D 41/068;
(Continued)

(56) References Cited

U.S. PATENT DOCUMENTS 4,424,675 A * 1/1984 Ojima .................. F02B 37/186
60/602
5,551,236 A * 9/1996 Zimmer ................ F02B 37/16
60/605.1
(Continued)

FOREIGN PATENT DOCUMENTS

JP 11 132033 5/1999
JP 2002 213247 7/2002
(Continued)

OTHER PUBLICATIONS

International Search Report dated Feb. 7, 2012 in PCT/JP12/050360 Filed Jan. 11, 2012.

*Primary Examiner* — Jason Shanske
*Assistant Examiner* — Jessica Kebea
(74) *Attorney, Agent, or Firm* — Oblon, McClelland, Maier & Neustadt, L.L.P.

(57) ABSTRACT

A control apparatus for an internal combustion engine of this invention includes: a turbo-supercharger; an exhaust gas purifying catalyst disposed in an exhaust passage on the downstream side of a turbine; and a WGV capable of opening and closing an exhaust bypass passage that bypasses the turbine. At the time of a catalyst warm-up request, catalyst warm-up control that opens the WGV and retards the ignition timing is executed. If the sensitivity of control of an intake air amount by a throttle valve is high, the intake air amount is controlled using the throttle valve during execution of the catalyst warm-up control. If the control sensitivity is low, the intake air amount is controlled using the WGV during execution of the catalyst warm-up control. When the WGV degree of opening is controlled toward a closed side during execution of the intake air amount control using the WGV, a retard amount of the ignition timing is increased.

8 Claims, 4 Drawing Sheets (51) Int. Cl.

| | |
|---|---|
| *F02D 41/06* | (2006.01) |
| *F02D 41/08* | (2006.01) |
| *F02B 37/18* | (2006.01) |
| *F02D 9/00* | (2006.01) |
| *F02D 23/00* | (2006.01) |
| *F02D 37/02* | (2006.01) |
| *F02P 5/04* | (2006.01) |
| *F02P 5/15* | (2006.01) |
| *F02D 9/02* | (2006.01) |
| *F02B 37/16* | (2006.01) |
| *F01N 9/00* | (2006.01) |

(52) U.S. Cl.
 CPC .............. *F02B 37/186* (2013.01); *F02D 9/02* (2013.01); *F02D 23/00* (2013.01); *F02D 37/02* (2013.01); *F02D 41/0002* (2013.01); *F02D 41/024* (2013.01); *F02D 41/068* (2013.01); *F02D 41/086* (2013.01); *F02P 5/045* (2013.01); *F02P 5/1508* (2013.01); *F01N 2410/06* (2013.01); *F02D 2041/0017* (2013.01); *Y02T 10/144* (2013.01); *Y02T 10/26* (2013.01); *Y02T 10/42* (2013.01); *Y02T 10/46* (2013.01)

(58) Field of Classification Search
 CPC .............. F02D 41/086; F02D 41/0002; F02D 2041/0017; F02D 41/0235; F02D 41/0245; F02D 41/08; F02D 37/02; F02B 37/16; F02B 37/18; F02B 37/186; F01N 9/00; F01N 2410/06; F02P 5/045; F02P 5/1508; F02P 5/05; Y02T 10/144; Y02T 10/26; Y02T 10/46; Y02T 10/42
 USPC .................. 60/602, 284, 280, 285
 See application file for complete search history.

(56) References Cited

U.S. PATENT DOCUMENTS

| | | | |
|---|---|---|---|
| 6,161,384 A * | 12/2000 | Reinbold | F02B 37/12 60/602 |
| 7,159,568 B1 * | 1/2007 | Lewis | F02D 19/084 123/299 |
| 2006/0005821 A1 | 1/2006 | Osumi et al. | |
| 2008/0022678 A1 * | 1/2008 | Irisawa | F01N 3/101 60/600 |
| 2009/0030588 A1 | 1/2009 | Yamashita | |
| 2009/0118979 A1 * | 5/2009 | Sato | F02D 41/0007 701/103 |
| 2011/0010072 A1 * | 1/2011 | Burkhardt | F02D 23/00 701/102 |
| 2014/0251268 A1 * | 9/2014 | Yamada | F01N 3/023 123/345 |
| 2014/0298802 A1 * | 10/2014 | Suzuki | F02D 13/02 60/602 |

FOREIGN PATENT DOCUMENTS

| | | |
|---|---|---|
| JP | 2004 124745 | 4/2004 |
| JP | 2006 152821 | 6/2006 |
| JP | 2006 322427 | 11/2006 |
| JP | 2006 348757 | 12/2006 |
| JP | 2007 218143 | 8/2007 |
| JP | 2008 190342 | 8/2008 |
| JP | 2009 24677 | 2/2009 |
| WO | WO 2006/123836 A1 | 11/2006 |
| WO | 2013 118263 | 8/2013 |

\* cited by examiner

Fig. 3

CONTROL APPARATUS FOR INTERNAL COMBUSTION ENGINE

TECHNICAL FIELD

The present invention relates to a control apparatus for an internal combustion engine, and more particularly to a control apparatus for a supercharged internal combustion engine that includes a turbo-supercharger and a waste gate valve that opens and closes an exhaust bypass passage that bypasses a turbine of the turbo-supercharger.

BACKGROUND ART

A control apparatus for an internal combustion engine which includes a turbo-supercharger and a waste gate valve that opens and closes an exhaust bypass passage that bypasses a turbine has already been disclosed in, for example, Patent Literature 1. According to the conventional control apparatus, a configuration is adopted so as to perform the following control to warm up an exhaust gas purifying catalyst that is disposed on the downstream side of the turbine after a cold startup. That is, when the internal combustion engine is in an idling state after a cold startup, the aforementioned control apparatus is configured so as to execute catalyst warm-up control (specifically, corresponds to "upstream catalyst warm-up process" in Patent Literature 1) that opens the waste gate valve and retards the ignition timing.

Meanwhile, the atmospheric pressure is low in a highland area. If the air density decreases accompanying a decrease in the atmospheric pressure, the torque that is generated by an internal combustion engine decreases. Consequently, in a highland area, it is necessary to enlarge the degree of opening of a throttle valve in order to secure an intake air amount (required intake air amount) that is required to maintain an idling speed during execution of the above described catalyst warm-up control. Consequently, a difference between the intake pressures before and after the throttle valve decreases. For this reason, in a highland area, in some cases it is difficult to perform adjustment of the aforementioned required intake air amount using the throttle valve while catalyst warm-up control is being executed.

Further, since the exhaust gas temperature rises when the ignition timing is retarded, the amount of exhaust energy that is introduced into the exhaust gas purifying catalyst can be increased. However, retarding the ignition timing leads to a decrease in the torque of the internal combustion engine. Accordingly, in a highland area, in a case where maintaining the idling speed is prioritized when it has become difficult to secure the required intake air amount using the throttle valve during execution of catalyst warm-up control, it is difficult to sufficiently retard the ignition timing. Consequently, it is difficult to maintain the amount of energy that is introduced to the exhaust gas purifying catalyst at a high level. Thus, with respect to the catalyst warm-up control disclosed in the aforementioned Patent Literature 1, there is a concern that in a highland area where the atmospheric pressure is low, a situation may arise in which an exhaust gas purifying catalyst cannot be warmed up sufficiently.

Including the above described document, the applicant is aware of the following documents as related art of the present invention.

CITATION LIST

Patent Documents

Patent Document 1: Japanese Laid-open Patent Application Publication No. 2006-322427
Patent Document 2: Japanese Laid-open Patent Application Publication No. 2004-124745
Patent Document 3: Japanese Laid-open Patent Application Publication No. 2006-152821
Patent Document 4: Japanese Laid-open Patent Application Publication No. 2002-213247

SUMMARY OF INVENTION

The present invention has been conceived to solve the above described problem, and an object of the present invention is to provide a control apparatus for an internal combustion engine that, in a case where the internal combustion engine includes a turbo-supercharger and a waste gate valve that opens and closes an exhaust bypass passage that bypasses a turbine of the turbo-supercharger, is configured to be capable of favorably securing warm-up performance with respect to an exhaust gas purifying catalyst that is disposed on the downstream side of the turbine regardless of whether the atmospheric pressure is high or low.

One aspect of the present invention is a control apparatus for an internal combustion engine having a turbo-supercharger and an exhaust gas purifying catalyst that is disposed in an exhaust passage on the downstream side of a turbine of the turbo-supercharger; the control apparatus including: a throttle valve, an ignition device, an exhaust bypass passage, a waste gate valve, catalyst warm-up execution means, first intake air amount control means, second intake air amount control means, and ignition timing control means.

The throttle valve adjusts an intake air amount that is drawn into the internal combustion engine. The ignition device is included for igniting an air-fuel mixture in a cylinder of the internal combustion engine. The exhaust bypass passage branches from the exhaust passage on the upstream side of the turbine, and merges again with the exhaust passage at a location between the turbine and the exhaust gas purifying catalyst. The waste gate valve is capable of opening and closing the exhaust bypass passage. The catalyst warm-up execution means executes catalyst warm-up control that opens the waste gate valve and retards an ignition timing when there is a catalyst warm-up request to warm up the exhaust gas purifying catalyst. In a case where a control sensitivity with respect to control of an intake air amount by the throttle valve is high, the first intake air amount control means performs first intake air amount control that controls the intake air amount using the throttle valve so that a required intake air amount is obtained during execution of the catalyst warm-up control. In a case where the control sensitivity is low, the second intake air amount control means performs second intake air amount control that controls the intake air amount using the waste gate valve so that the required intake air amount is obtained during execution of the catalyst warm-up control. The ignition timing control means increases a retard amount of the ignition timing when a degree of opening of the waste gate valve is controlled toward the closed side during execution of the second intake air amount control.

According to the one aspect of the present invention, a configuration is adopted so as to appropriately use two kinds of intake air amount control in accordance with whether the control sensitivity with respect to control of the intake air amount by the throttle valve is high or low. It is thus possible to control the intake air amount utilizing the waste gate valve even when the aforementioned control sensitivity is low. Further, the retard amount of the ignition timing is increased when the degree of opening of the waste gate valve during execution of the second intake air amount control is controlled toward the closed side. It is thus possible to compensate for a drop in the energy introduced to the exhaust gas purifying catalyst that accompanies closing of the waste gate valve. Consequently, according to the present invention, warm-up performance with respect to the exhaust gas purifying catalyst that is disposed on the downstream side of the turbine can be favorably secured regardless of whether the atmospheric pressure is high or low.

The one aspect of the present invention may further include an intake bypass passage that branches from an intake passage on the upstream side of a compressor of the turbo-supercharger, and merges again with the intake passage at a location between the compressor and the throttle valve. The one aspect may also include an air bypass valve that is capable of opening and closing the intake bypass passage. In addition, the one aspect may further include air bypass valve control means for increasing a degree of opening of the air bypass valve in a case where it is predicted that an amount of retard of the ignition timing by the ignition timing control means will be equal to or greater than a predetermined value.

An exhaust gas amount that is discharged from inside a cylinder decreases when the air bypass valve is opened. Therefore, exhaust emissions that are released during warm-up of the exhaust gas purifying catalyst can be reduced. Accordingly, when compensating for a drop in energy introduced to the exhaust gas purifying catalyst that is caused by retard of the ignition timing, a deterioration in the exhaust emission performance during warm-up due to an insufficient retard amount of the ignition timing can be suppressed while also avoiding a deterioration in combustion that is caused by an increase in the retard amount of the ignition timing.

The catalyst warm-up execution means according to the one aspect of the present invention may execute the catalyst warm-up control in a fast idling state after a cold startup of the internal combustion engine. The first intake air amount control means may, in a case where the control sensitivity is high, control the throttle valve so that the required intake air amount that is necessary for maintaining an engine speed at a predetermined speed at the time of the fast idling is obtained. Further, the second intake air amount control means may, in a case where the control sensitivity is low, control the waste gate valve so that the required intake air amount that is necessary for maintaining the engine speed at the predetermined speed at the time of the fast idling is obtained.

Thus, in a fast idling state after a cold startup, warm-up performance with respect to the exhaust gas purifying catalyst that is disposed on the downstream side of the turbine can be favorably secured regardless of whether the atmospheric pressure is high or low.

Another aspect of the present invention is a control apparatus for an internal combustion engine having a turbo-supercharger and an exhaust gas purifying catalyst that is disposed in an exhaust passage on the downstream side of a turbine of the turbo-supercharger; the control apparatus including: a throttle valve, an ignition device, an exhaust bypass passage, a waste gate valve, an intake bypass passage, an air bypass valve, catalyst warm-up execution means, first intake air amount control means, second intake air amount control means, and ignition timing control means.

The throttle valve adjusts an intake air amount that is drawn into the internal combustion engine. The ignition device is included for igniting an air-fuel mixture in a cylinder of the internal combustion engine. The exhaust bypass passage branches from the exhaust passage on the upstream side of the turbine, and merges again with the exhaust passage at a location between the turbine and the exhaust gas purifying catalyst. The waste gate valve is capable of opening and closing the exhaust bypass passage. The intake bypass passage branches from an intake passage on the upstream side of a compressor of the turbo-supercharger, and merges again with the intake passage at a location between the compressor and the throttle valve. The air bypass valve is capable of opening and closing the intake bypass passage. The catalyst warm-up execution means executes catalyst warm-up control that opens the waste gate valve and retards an ignition timing when there is a catalyst warm-up request to warm-up the exhaust gas purifying catalyst. In a case where a control sensitivity with respect to control of an intake air amount by the throttle valve is high, the first intake air amount control means performs first intake air amount control that controls the intake air amount using the throttle valve so that a required intake air amount is obtained during execution of the catalyst warm-up control. In a case where the control sensitivity is low, the second intake air amount control means performs second intake air amount control that controls a degree of opening of the waste gate valve toward the closed side and controls the intake air amount using the air bypass valve so that the required intake air amount is obtained during execution of the catalyst warm-up control. The ignition timing control means increases a retard amount of the ignition timing in accordance with the degree of opening of the waste gate valve that is controlled toward the closed side during execution of the second intake air amount control.

According to the another aspect of the present invention, a configuration is adopted so as to appropriately use two kinds of intake air amount control in accordance with whether the control sensitivity with respect to control of the intake air amount by the throttle valve is high or low. Thus, even in a case where the aforementioned control sensitivity is low, the intake air amount can be controlled by closing the waste gate valve and utilizing the air bypass valve. Further, during execution of the second intake air amount control, the retard amount of the ignition timing is increased in accordance with the degree of opening of the waste gate valve that is controlled toward the closed side. It is thus possible to compensate for a drop in the energy introduced to the exhaust gas purifying catalyst that accompanies closing of the waste gate valve. Consequently, according to the present invention, warm-up performance with respect to the exhaust gas purifying catalyst that is disposed on the downstream side of the turbine can be favorably secured regardless of whether the atmospheric pressure is high or low.

The another aspect of the present invention may further include air bypass valve control means for increasing a degree of opening of the air bypass valve in a case where it is predicted that an amount of retard of the ignition timing by the ignition timing control means will be equal to or greater than a predetermined value.

The amount of exhaust gas that is discharged from inside a cylinder decreases when the air bypass valve is opened. Therefore, exhaust emissions that are released during warm-up of the exhaust gas purifying catalyst can be reduced.

Accordingly, when compensating for a drop in energy introduced to the exhaust gas purifying catalyst that is caused by retard of the ignition timing, a deterioration in the exhaust emission performance during warm-up due to an insufficient retard amount of the ignition timing can be suppressed while also avoiding a deterioration in combustion that is caused by an increase in the retard amount of the ignition timing.

The catalyst warm-up execution means according to the another aspect of the present invention may execute the catalyst warm-up control in a fast idling state after a cold startup of the internal combustion engine. The first intake air amount control means may, in a case where the control sensitivity is high, control the throttle valve so that the required intake air amount that is necessary for maintaining an engine speed at a predetermined speed at the time of the fast idling is obtained. Further, the second intake air amount control means may, in a case where the control sensitivity is low, control the air bypass valve so that the required intake air amount that is necessary for maintaining the engine speed at the predetermined speed at the time of the fast idling is obtained.

Thus, in a fast idling state after a cold startup, warm-up performance with respect to the exhaust gas purifying catalyst that is disposed on the downstream side of the turbine can be favorably secured regardless of whether the atmospheric pressure is high or low.

DESCRIPTION OF EMBODIMENTS

Embodiment 1

Description of System Configuration

Figure 1:
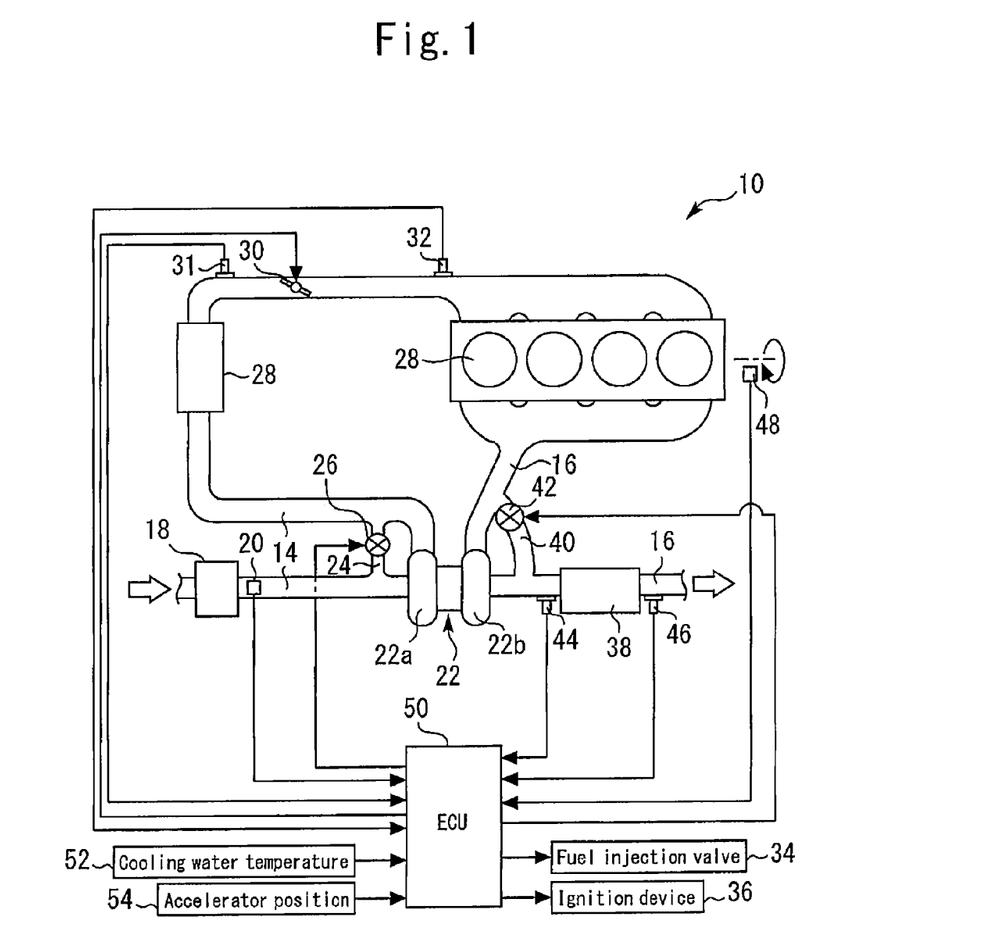
FIG. 1 is a schematic view for describing the system configuration of an internal combustion engine according to Embodiment 1 of the present invention.

FIG. 1 is a schematic view for describing the system configuration of an internal combustion engine 10 according to Embodiment 1 of the present invention. A system of the present embodiment includes a spark ignition-type internal combustion engine (as one example, a gasoline engine) 10. A combustion chamber 12 is formed inside each cylinder of the internal combustion engine 10. An intake passage 14 and an exhaust passage 16 communicate with the combustion chamber 12.

An air cleaner 18 is installed in the vicinity of the inlet of the intake passage 14. An air flow meter 20 that outputs a signal in accordance with a flow rate of air that is drawn into the intake passage 14 is provided in the vicinity of the air cleaner 18 on the downstream side thereof. A compressor 22a of a turbo-supercharger 22 is arranged downstream of the air flow meter 20. The compressor 22a is integrally connected through a connecting shaft (not illustrated in the drawings) with a turbine 22b arranged in the exhaust passage 16. An intake bypass passage 24 for bypassing the compressor 22a is connected to the intake passage 14. An air bypass valve (ABV) 26 for controlling the flow rate of air that passes through the intake bypass passage 24 is arranged partway along the intake bypass passage 24.

An intercooler 28 that cools compressed air is provided on the downstream side of the compressor 22a. An electronically controlled throttle valve 30 is provided downstream of the intercooler 28. At a location in the intake passage 14 that is on the upstream side of the throttle valve 30 and on a downstream side of the compressor 22a (and the intercooler 28), a throttle upstream pressure sensor 31 is installed that detects an intake pressure (throttle upstream pressure) at the aforementioned location. Further, at a location in the intake passage 14 that is on a downstream side of the throttle valve 30 (convergence portion (surge tank portion) of the intake manifold), a throttle downstream pressure sensor 32 is installed that detects an intake pressure (throttle downstream pressure) at the aforementioned location.

Each cylinder of the internal combustion engine 10 is provided with a fuel injection valve 34 for injecting fuel into the cylinder, and an ignition device 36 for igniting an air-fuel mixture.

An exhaust gas purifying catalyst (hereunder, referred to as simply "catalyst") 38 for purifying exhaust gas is arranged in the exhaust passage 16 on a downstream side of the turbine 22b. An exhaust bypass passage 40 is connected to the exhaust passage 16. The exhaust bypass passage 40 is configured so as to branch from the exhaust passage 16 at a location that is further on the upstream side than the turbine 22b, and to merge again with the exhaust passage 16 at a location that is between the turbine 22b and the catalyst 38. A waste gate valve (WGV) 42 that is capable of opening and closing the exhaust bypass passage 40 is provided partway along the exhaust bypass passage 40. In this case, it is assumed that the WGV 42 is configured to be adjustable to an arbitrary opening degree by means of an electric motor (not illustrated in the drawings).

An A/F sensor 44 that produces a substantially linear output with respect to an air-to-fuel ratio of exhaust gas that flows into the catalyst 38 is arranged in the exhaust passage 16 at a location that is on the upstream side of the catalyst 38. On the downstream side of the catalyst 38 in the exhaust passage 16 is arranged an $O_2$ sensor 46 that generates a rich output when exhaust gas flowing thereto from the catalyst 38 is rich relative to the theoretical air-to-fuel ratio, and generates a lean output when the exhaust gas is lean relative to the theoretical air-to-fuel ratio. A crank angle sensor 48 for detecting the engine speed and the crank angle is also installed in the internal combustion engine 10.

The system illustrated in FIG. 1 also includes an ECU (Electronic Control Unit) 50. In addition to the air flow meter 20, the throttle upstream pressure sensor 31, the throttle downstream pressure sensor 32, the A/F sensor 44, the $O_2$ sensor 46, and the crank angle sensor 48 that are described above, various sensors for detecting the operating state of the internal combustion engine 10 such as a water temperature sensor 52 for detecting an engine cooling water temperature are connected to the ECU 50. An accelerator position sensor 54 for detecting a depression amount of an accelerator pedal (accelerator position) of the vehicle in which the internal combustion engine 10 is mounted is also connected to the ECU 50. In addition, various actuators for controlling the operating state of the internal combustion engine 10 such as the ABV 26, the throttle valve 30, the fuel injection valve 34, the ignition device 36 and the WGV 42 that are described above are connected to the ECU 50. The ECU 50 controls the operating state of the internal combustion engine 10 by causing the various actuators to operate based on the outputs of the various sensors and predetermined programs.

Characteristic Catalyst Warm-Up Control in Embodiment 1

In the internal combustion engine 10 having the above described configuration, in a situation in which the catalyst 38 has not reached a predetermined activated state, such as a situation at the time of a cold startup, catalyst warm-up control is executed to warm up the catalyst 38 in order to quickly reach an activated state. The catalyst warm-up control of the present embodiment is basically control that opens the WGV 42 and retards the ignition timing. In comparison to a case where the WGV 42 is closed, when the WGV 42 is open the amount of exhaust energy that is recovered by the turbine 22b decreases, and consequently the amount of exhaust energy that is introduced to the catalyst 38 on the downstream side can be increased. Further, the exhaust gas temperature increases when the ignition timing is retarded, and hence the amount of exhaust energy that is introduced to the catalyst 38 on the downstream side can be increased.

Further, it is taken as a premise that, in a case where starting of the internal combustion engine 10 was commenced in a cold state, to accelerate the warming up of the internal combustion engine 10 including the catalyst 38, the internal combustion engine 10 is controlled in a fast idling state in which the internal combustion engine 10 operates at a higher speed than in a normal idling state (hereunder, the engine speed in such a case is referred to as "fast idling speed"). The catalyst warm-up control of the present embodiment is mainly executed in the above described fast idling state. However, the present catalyst warm-up control is not only executed in the fast idling state, and the present catalyst warm-up control can also be executed in a state in which the internal combustion engine 10 is operated at a requested load accompanying a request to start to move the vehicle that is made by the driver in the fast idling state.

During execution of the catalyst warm-up control, fundamentally, the intake air amount is controlled using the throttle valve 30 so that an intake air amount that is required by the internal combustion engine 10 (hereunder, referred to as "required intake air amount") is obtained. More specifically, when the internal combustion engine 10 is in the fast idling state, the intake air amount is controlled using the throttle valve 30 so that an intake air amount (corresponds to the required intake air amount in this case) that is required to maintain a predetermined fast idling speed is obtained. According to the above described catalyst warm-up control, warm-up of the catalyst 38 can be accelerated by intentionally increasing the amount of exhaust energy that is introduced to the catalyst 38.

Meanwhile, the atmospheric pressure is lower in a highland area. When the air density decreases accompanying a drop in the atmospheric pressure, the torque that the internal combustion engine 10 generates decreases. Consequently, in a highland area, it is required to increase the degree of opening of the throttle valve 30 in order to secure the required intake air amount during execution of the catalyst warm-up control (including a case where the internal combustion engine 10 is in the fast idling state). Consequently, a difference between the intake pressures before and after the throttle valve 30 decreases. For such reasons, in a highland area, it is difficult in some cases to perform the above described adjustment of the required intake air amount using the throttle valve 30 while executing the catalyst warm-up control.

Further, in a case where the ignition timing is retarded, the amount of exhaust energy that is introduced to the catalyst 38 can be increased since the exhaust gas temperature rises. However, retarding of the ignition timing leads to a decrease in the torque of the internal combustion engine 10. Accordingly, in a highland area, when it has become difficult to secure the required intake air amount using the throttle valve 30 during execution of the catalyst warm-up control, in a case where securing the required torque of the internal combustion engine 10 (in a fast idling state, maintaining the fast idling speed) is prioritized, it is difficult to adequately retard the ignition timing. Consequently, it is difficult to maintain the amount of energy that is introduced to the catalyst 38 at a high level.

Therefore, according to the present embodiment, to ensure that favorable warm-up performance can be secured with respect to the catalyst 38 regardless of whether the atmospheric pressure is high or low (that is, whether the vehicle is in a flatland area or a highland area), the following control is performed as necessary in addition to the fundamental control in the catalyst warm-up control that is described above.

Specifically, in the case of performing the catalyst warm-up control, first the above described fundamental control is attempted (that is, control of the intake air amount using the throttle valve 30 so as to obtain the required intake air amount while opening the WGV 42 and retarding the ignition timing). Subsequently, if a state is reached in which adjustment of the intake air amount by means of the throttle valve 30 is difficult (specifically, a state in which a difference between the intake pressures before and after the throttle valve 30 is less than or equal to a predetermined value) because the air density is low due to the influence of the atmospheric pressure, the degree of opening of the throttle is fixed at the degree of opening in this state. Furthermore, control of the intake air amount is performed by adjusting the degree of opening of the WGV 42 so that the required intake air amount is obtained. In addition, in this case, a retard amount of the ignition timing is increased to compensate for the amount of a decrease in the energy introduced to the catalyst 38 that accompanies closing of the WGV 42.

Further, according to the catalyst warm-up control of the present embodiment, in a case where retard of the ignition timing is performed up to a point that deterioration of combustion due to retard of the ignition timing is assumed to occur while adjusting the intake air amount using the WGV 42, the ignition timing is fixed at a retard amount that is a limit from the viewpoint of suppressing combustion deterioration, and the degree of opening of the WGV is set so as to satisfy the relation in equation (3) that is described below.

Figure 2:
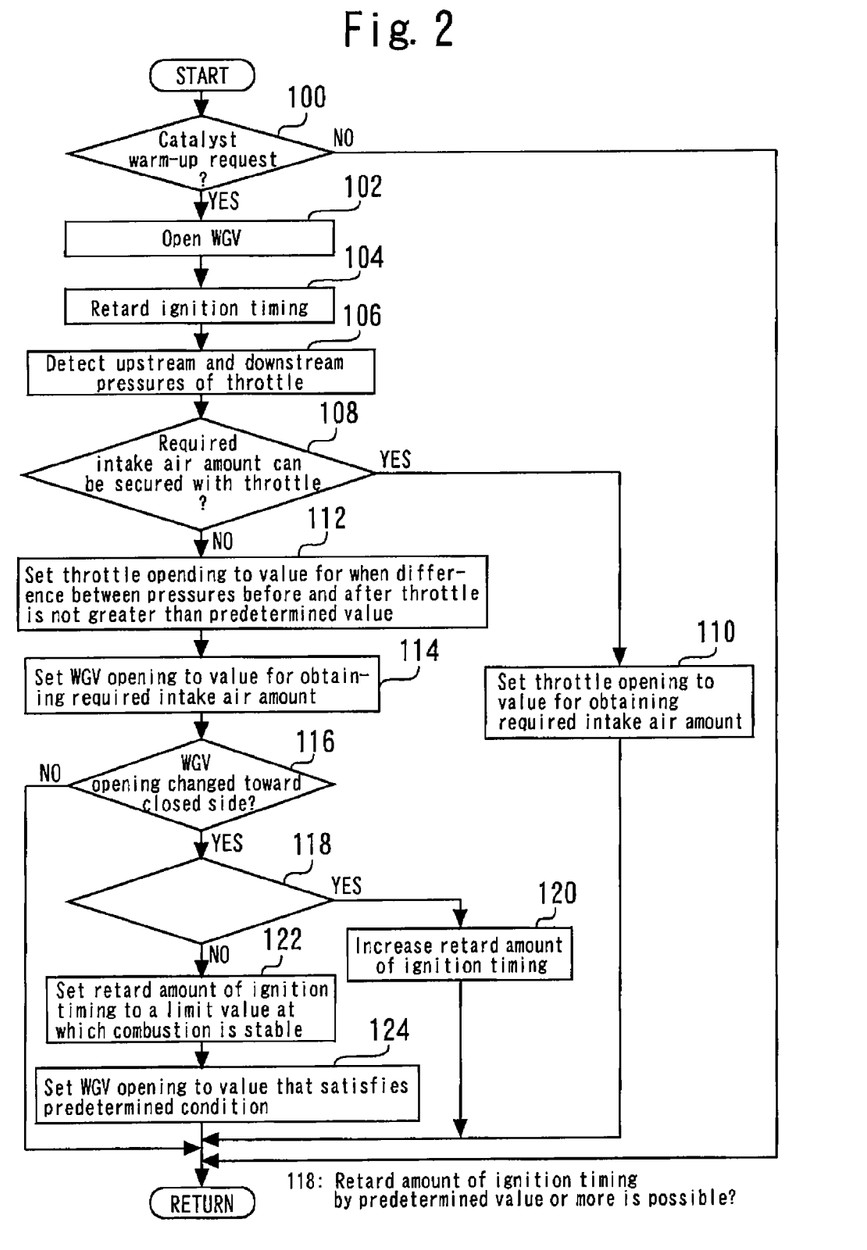
FIG. 2 is a flowchart of a routine that is executed in Embodiment 1 of the present invention.

FIG. 2 is a flowchart illustrating a control routine that the ECU 50 executes to realize the catalyst warm-up control in Embodiment 1 of the present invention. It is assumed that the present routine is started when the internal combustion engine 10 is started and is repeatedly executed for each predetermined control period.

According to the routine shown in FIG. 2, first, the ECU 50 determines whether or not there is a catalyst warm-up request to warm up the catalyst 38 (step 100). Specifically, the ECU 50 can determine whether or not the internal combustion engine 10 is in an unwarmed state after a cold startup, based on whether or not the engine cooling water temperature is equal to or less than a predetermined value. In the present step 100, if the internal combustion engine 10 is in an unwarmed state, the ECU 50 determines that there is a catalyst warm-up request if a predetermined catalyst warm-up completion condition is not established. Whether or not the catalyst warm-up completion condition is established can be determined, for example, on the basis of whether or not an integrated value of the intake air amount after starting the internal combustion engine 10 has reached a predetermined value (value that is previously set based on experimentation and the like) for determining whether or not the catalyst is warmed up.

In the aforementioned step 100, if it is determined that there is a catalyst warm-up request, the processing in steps 102 and 104 are executed in order. In step 102, the WGV 42 is opened to accelerate warm-up of the catalyst 38. Specifically, the degree of opening of the WGV in this case is obtained by opening the WGV to a predetermined degree of opening relative to a degree of opening of the WGV under the same operating state (defined by the intake air amount and the engine speed) in a case where the catalyst warm-up control is not performed. This kind of adjustment of the degree of opening of the WGV includes a form in which the WGV 42 is opened to a predetermined degree of opening from a fully closed state, and a form in which the degree of opening of the WGV 42 that is already open is further increased by a predetermined degree of opening.

In step 104, the ignition timing is retarded in order to accelerate warm-up of the catalyst 38. Specifically, the ignition timing in this case is retarded by a predetermined amount relative to the basic ignition timing under the same operating state in which the catalyst warm-up control is not performed. Note that, the retard amount of the ignition timing in this case is a value that differs according to the operating state (for example, according to whether the internal combustion engine 10 is in an idling state or is generating a torque to cause the vehicle to run).

Next, a throttle upstream pressure and a throttle downstream pressure are detected using the throttle upstream pressure sensor 31 and the throttle downstream pressure sensor 32 described above (step 106).

Thereafter, the ECU 50 determines whether or not it is possible to secure the current required intake air amount by adjustment of the throttle valve 30 (step 108). Specifically, the ECU 50 determines whether or not the differential pressure between the throttle upstream pressure and the throttle downstream pressure acquired in the aforementioned step 106 is not equal to or less than a predetermined value. In a state in which the differential pressure between the throttle upstream pressure and the throttle downstream pressure is equal to or less than (almost equal to) the predetermined value, adjustment of the intake air amount by the throttle valve 30 is difficult. In other words, in this state, the sensitivity of control of the intake air amount by the throttle valve 30 decreases. The predetermined value of the differential pressure in the present step 108 is a value that is previously set as a threshold value for determining whether the control sensitivity with respect to the control of the intake air amount by the throttle valve 30 is in a high state or in a low state.

If the result determined in the aforementioned step 108 is affirmative, that is, if it can be determined that the control sensitivity with respect to the control of the intake air amount by the throttle valve 30 is in a high state because the aforementioned differential pressure is not equal to or less than the aforementioned predetermined value, the processing in step 110 is executed.

Since the amount of exhaust energy that is supplied to the turbine 22b decreases when the WGV 42 is opened (when the degree of opening of the WGV increases), the turbine speed decreases. Consequently, the throttle upstream pressure decreases under the same degree of throttle opening condition. Accordingly, it is necessary to increase the degree of opening of the throttle to maintain the same intake air amount in a case where the WGV 42 is opened (a case where the degree of opening of the WGV is increased). Further, if the ignition timing is retarded, the torque of the internal combustion engine 10 decreases. Accordingly, a larger intake air amount is required to maintain the same level of torque as prior to retard of the ignition timing (if the state is the fast idling state, to maintain the same fast idling speed). Therefore, it is necessary to increase the intake air amount by enlarging the degree of opening of the throttle. The degree of opening of the throttle is set to a value for ensuring that the current required intake air amount is obtained in step 110 upon receiving this kind of request, under circumstances in which control of the degree of opening of the WGV and control of the ignition timing have been performed in steps 102 and 104.

In contrast, if the result determined in the aforementioned step 108 is negative, that is, when it can be determined that the sensitivity of control of the intake air amount by the throttle valve 30 is in a low state based on the fact that the aforementioned differential pressure is equal to or less than the aforementioned predetermined value, the processing from step 112 onward are executed in order. In step 112, the degree of opening of the throttle is set to a degree of opening for when the aforementioned differential pressure (difference between the intake pressures before and after the throttle valve 30) is less than or equal to the aforementioned predetermined value.

Next, the degree of opening of the WGV is set to a degree of opening at which the current required intake air amount is obtained under the degree of opening of the throttle that was set in the aforementioned step 112 (step 114). Specifically, on the basis of maps (not illustrated in the drawings) that are based on the operating state which are included in the ECU 50, the relation between an amount of change in the degree of opening of the WGV and an amount of change in a supercharging pressure can be acquired, and an amount of change of the intake air amount can be acquired based on the amount of change in the supercharging pressure. Therefore, based on the relations in these maps, the degree of opening of the WGV that is required to ensure that a required intake air amount is obtained can be calculated. Next, the ECU 50 determines whether or not the degree of opening of the WGV was changed toward the closed side by the processing in the aforementioned step 114 (step 116). If the result determined in the present step 116 is affirmative, the ECU 50 then determines whether or not retard of the ignition timing by a value that is equal to or greater than a predetermined value is possible, in other words, the ECU 50 determines whether or not a limit value of the ignition timing for which combustion is stable has not been reached (step 118).

If the result determined in the aforementioned step 118 is affirmative, the retard amount of the ignition timing is increased (step 120). When the WGV 42 is closed (when the degree of opening of the WGV is reduced), the amount of exhaust energy that is introduced to the catalyst 38 on the downstream side decreases. Consequently, in the present step 120, the retard amount of the ignition timing is increased to compensate for the amount of decrease in the energy introduced to the catalyst 38 due to the WGV 42 being controlled toward the closed side.

More specifically, in the present step 120, the retard amount of the ignition timing is determined based on the relation with the degree of opening of the WGV that was set in the aforementioned step 114, so as to become a value that satisfies the relation in the following equation (1) (in the fast idling state, a value that simultaneously satisfies the relation in equation (2) in addition to equation (1)).

$$\Delta Ga1 \times \Delta Qsa = \Delta Qc1 \quad (1)$$

$$\Delta Ga1 = \Delta Ga2 \quad (2)$$

Where, in the above equation (1), $\Delta Ga1$ represents the amount of an increase in the intake air amount that is produced as the result of closing the WGV 42 to the degree of opening set in the aforementioned step 114. In addition, $\Delta Qsa$ represents the amount of an increase in the energy per unit intake air amount when the retard amount of the ignition timing is increased to become the value set in the present step 120. Further, $\Delta Qc1$ represents an amount by which the energy introduced to the catalyst 38 decreases as a result of closing the WGV 42 to the degree of opening set in the aforementioned step 114. In addition, in the above equation (2), $\Delta Ga2$ represents an intake air increase amount that is required to maintain a predetermined fast idling speed in a state in which the retard amount of the ignition timing is increased so as to become the value set in the present step 120.

These values $\Delta Ga1$, $\Delta Qsa$, $\Delta Qc1$ and $\Delta Ga2$ can be respectively calculated, for example, by the following methods. That is, with respect to calculation of $\Delta Ga1$, a relation (for example, a map) between an amount of change in the degree of opening of the WGV and an amount of change in the supercharging pressure accompanying the relevant change in the degree of opening of the WGV is previously determined by experimentation or the like and stored in the ECU 50. Based on such a relation, the ECU 50 calculates an amount of change in the supercharging pressure with respect to the amount of change in the degree of opening of the WGV that changes from the current degree of opening of the WGV to the value set in the aforementioned step 114. The ECU 50 then calculates the intake air increase amount $\Delta Ga1$ based on the calculated amount of change in the supercharging pressure.

With respect to calculation of $\Delta Qsa$, a relation (for example, a map) between an amount of change toward the retard side of the ignition timing and an amount of change $\Delta T$ in the exhaust gas temperature accompanying retard of the ignition timing by the amount of change is previously determined by experimentation or the like and stored in the ECU 50. The value of $\Delta Qsa$ can be calculated by multiplying a value of the specific heat c of exhaust gas per unit mass by an amount of change $\Delta T$ in the exhaust gas temperature that is calculated utilizing the aforementioned relation. Further, with respect to calculation of $\Delta Qc1$, a relation (for example, a map) between an amount of change in the degree of opening of the WGV and an amount of decrease in an energy amount that is introduced to the catalyst 38 accompanying the change in the degree of opening of the WGV is previously determined by experimentation or the like and stored in the ECU 50. The value of $\Delta Qc1$ can be calculated by utilizing the aforementioned relation. In addition, with respect to calculation of $\Delta Ga2$, a relation (for example, a map) between an amount of change toward the retard side of the ignition timing and an intake air increase amount that is required to maintain a predetermined fast idling speed in a state in which the ignition timing has been retarded by the amount of change is previously determined by experimentation or the like and stored in the ECU 50. The value of $\Delta Ga2$ can be calculated utilizing the aforementioned relation.

In contrast, if the result determined in the aforementioned step 118 is negative, that is, in a case where it is determined that a limit value of the ignition timing from the viewpoint of suppressing combustion deterioration is reached, the retard amount of the ignition timing for the current processing is set to the limit value at which combustion is stable (step 122). A limit value of a retard amount of the ignition timing of this kind in relation to the operating state of the internal combustion engine 10 is stored as a map in the ECU 50.

Next, a degree of opening of the WGV that satisfies the following condition is set (step 124). More specifically, in the present step 124, a degree of opening of the WGV is determined in relation to the retard limit amount of the ignition timing that was set in the aforementioned step 122, so as to be a value that satisfies the relation in the following equation (3).

$$\Delta Ga3 \times Qsa = \Delta Qc2 \quad (3)$$

Where, in the above equation (3), $\Delta Ga3$ represents an amount of increase in the intake air amount in a case where the degree of opening of the WGV is closed so as to become a value set in the present step 124. In addition, Qsa represents an energy amount per unit intake air amount at the retard limit amount of the ignition timing that was set in the aforementioned step 122. Further, $\Delta Qc2$ represents an amount by which the energy introduced to the catalyst 38 decreases in a case where the degree of opening of the WGV is closed so as to become the value set in the present step 124.

For example, $\Delta Ga3$ can be calculated by the above described method for $\Delta Ga1$. Further, Qsa can be calculated, for example, based on a map in which the relation between the value of Qsa and a retard limit amount of the ignition timing is previously determined. In addition, $\Delta Qc2$ can be calculated, for example, by the above described method for $\Delta Qc1$. In a case where the processing in the present step 124 is executed, the degree of opening of the WGV that is set in the present step 124 is used instead of the degree of opening of the WGV that was set in the aforementioned step 114.

According to the routine illustrated in FIG. 2 that is described above, in a case where the sensitivity of control of the intake air amount by the throttle valve 30 is in a high state when a catalyst warm-up request was issued (a case where the vehicle is in a flatland area in which the atmospheric pressure is comparatively high), the ignition timing is retarded accompanying opening of the WGV 42. Further, adjustment of the intake air amount in this case is performed using the throttle valve 30. On the other hand, in a case where the sensitivity of control of the intake air amount by the throttle valve 30 is in a low state when a catalyst warm-up request was issued (a case where the vehicle is in a highland area in which the atmospheric pressure is comparatively low), the degree of opening of the throttle is fixed at the value in this state, and the intake air amount is adjusted by adjusting the degree of opening of the WGV. Further, in this case, the retard amount of the ignition timing is increased to compensate for the amount of decrease in energy introduced to the catalyst 38 accompanying closing of the WGV 42.

Thus, even in a highland area in which the atmospheric pressure is low, an energy amount introduced to the catalyst 38 can be secured at a level that is equal to a level in a flatland area, while ensuring the controllability of the intake air amount so that the required intake air amount is obtained. More specifically, if the case is one in which the vehicle is in a fast idling state after a cold startup, in a highland area also, an energy amount introduced to the catalyst 38 can be secured at a level that is equal to a level in a flatland area while maintaining a predetermined fast idling speed. As described above, according to the catalyst warm-up control of the present embodiment, warm-up performance with respect to the catalyst 38 can be favorably secured regardless of whether the atmospheric pressure is high or low.

Further, according to the above described routine, in a case where the sensitivity of control of the intake air amount by the throttle valve 30 is in a low state when a catalyst warm-up request is issued, the degree of opening of the WGV and the retard amount of the ignition timing are set so as to satisfy the relation in the above equation (1) (the above equations (1) and (2) in the case of the fast idling state). That is, by utilizing the relation in the above described equation (1), the degree of opening of the WGV and the retard amount of the ignition timing are set taking into consideration the relation among: the intake air increase amount $\Delta Ga1$ that is generated by closing the WGV 42; the amount of increase in energy per unit intake air amount $\Delta Qsa$ that is generated as a result of increasing the retard amount of the ignition timing; and the amount of decrease $\Delta Qc1$ in the energy introduced to the catalyst as a result of closing the WGV 42. Further, in the case of the fast idling state, by also utilizing the equation (2) in addition to the equation (1), the degree of opening of the WGV and the retard amount of the ignition timing are set by taking into consideration the relation between the aforementioned $\Delta Ga1$ and the intake air increase amount $\Delta Ga2$ that is required to maintain a predetermined fast idling speed in a state in which the retard amount of the ignition timing is increased. Thus, regardless of whether the atmospheric pressure is high or low, the drivability of the internal combustion engine 10 can be ensured while securing an equal amount of energy that is introduced to the catalyst 38.

Furthermore, according to the above described routine, in a case where the ignition timing was retarded up to a point at which deterioration of combustion due to retard of the ignition timing is assumed to occur (a case where the result of the determination in the aforementioned step 118 is negative), the degree of opening of the WGV is set so as to satisfy the relation of the above described equation (3) in a state in which the ignition timing is fixed at the retard limit amount. That is, by utilizing the relation in the equation (3), the degree of opening of the WGV is set taking into consideration the relation among: the intake air increase amount $\Delta Ga3$ that is generated by closing the WGV 42; the energy increase amount Qsa per unit intake air amount at the retard limit amount of the ignition timing that is set; and the amount of decrease $\Delta Qc2$ in the energy introduced to the catalyst as a result of closing the WGV 42. Thus, regardless of whether the atmospheric pressure is high or low, the amount of energy introduced to the catalyst 38 can be favorably secured without loss of the combustion stability.

Incidentally, in the above described Embodiment 1, in a case where the ignition timing was retarded up to a point at which deterioration of combustion due to retard of the ignition timing is assumed to occur (a case where the result of the determination in the aforementioned step 118 is negative), the degree of opening of the WGV is set so as to satisfy the relation of the equation (3) in a state in which the ignition timing is fixed at the retard limit amount. However, a method for setting a suitable degree of opening of the WGV performed in this case is not limited to the above described method, and for example the setting method may be a method described hereunder.

That is, a configuration may also be adopted in which, in a case where the ignition timing was retarded up to a point at which deterioration of combustion due to retard of the ignition timing is assumed to occur, adjustment of the intake air amount is performed while opening the degree of opening of the WGV in a state in which the ignition timing is fixed at the retard limit amount. More specifically, the degree of opening of the WGV may be determined in relation to the retard limit amount of the ignition timing that was set in the aforementioned step 122, so as to be a value that satisfies the relation in the following equation (4).

$$\Delta Ga4 \times Qsa = \Delta Qc3 \quad (4)$$

Where, in the above equation (4), $\Delta Ga4$ represents an amount by which the intake air amount decreases when the WGV is opened so as to have a degree of opening of a value that is set in this case. Qsa is the value that is described above. Further, $\Delta Qc3$ represents an amount by which the energy introduced to the catalyst 38 increases when the WGV is opened so as to have a degree of opening of the value that is set in this case. For example, $\Delta Ga4$ can be calculated by a similar method as the method described above with respect to $\Delta Ga1$. Further, $\Delta Qc3$ can be calculated, for example, by a similar method as the method described above with respect to $\Delta Qc1$.

According to this method also, regardless of whether the atmospheric pressure is high or low, the amount of energy introduced to the catalyst 38 can be favorably secured without loss of the combustion stability. Further, according to the present method, because the intake air amount decreases when the WGV 42 is opened, although the fast idling speed decreases if the operating state is the fast idling state, the exhaust gas amount that is discharged from inside each cylinder decreases. Consequently, exhaust emissions released during warm-up of the catalyst 38 can be reduced. Accordingly, when compensating for a decrease in the amount of energy introduced to the catalyst 38 by retarding the ignition timing, it is possible to suppress a deterioration in the exhaust emission performance during warm-up due to an insufficient retard amount of the ignition timing.

Note that, in the above described Embodiment 1, the "catalyst warm-up execution means" according to the aforementioned one aspect of the present invention is realized by the ECU 50 executing the aforementioned processing of steps 102 and 104; the "first intake air amount control means" according to the aforementioned one aspect of the present invention is realized by the ECU 50 executing the aforementioned processing of 110 in a case where the result of the determination in step 108 is affirmative; the "second intake air amount control means" according to the aforementioned one aspect of the present invention is realized by the ECU 50 executing the aforementioned processing of step 114 in a case where the result of the determination in step 108 is negative; and the "ignition timing control means" according to the aforementioned one aspect of the present invention is realized by the ECU 50 executing the aforementioned processing of step 120 in a case where the results of the determinations in steps 116 and 118 are affirmative.

Embodiment 2

Next, Embodiment 2 of the present invention will be described referring to FIG. 3.

The system of the present embodiment can be realized by using the hardware configuration illustrated in FIG. 1 and causing the ECU 50 to execute the routine shown in FIG. 3, described later, instead of the routine shown in FIG. 2.

In the above described Embodiment 1 a configuration is adopted in which, in a case where the sensitivity of control of the intake air amount by the throttle valve 30 is low when a catalyst warm-up request was issued, the intake air amount is adjusted by adjusting the degree of opening of the WGV 42 while the degree of opening of the throttle valve is kept constant. In contrast, according to the catalyst warm-up control of the present embodiment, a configuration is adopted in which, in a case where the sensitivity of control of the intake air amount by the throttle valve 30 is in a low state when a catalyst warm-up request was issued, the degree of opening of the throttle valve is fixed at the degree of opening in this state and the WGV 42 is fully closed. Furthermore, in this case, adjustment of the degree of opening of the ABV 26 is utilized to adjust the intake air amount so that the required intake air amount is obtained. In addition, in this case also, a retard amount of the ignition timing is increased to compensate for the amount by which the energy introduced to the catalyst 38 decreases due to the WGV 42 being fully closed.

Further, according to the catalyst warm-up control of the present embodiment, in a case where it is predicted that the retard amount of the ignition timing will become equal to or greater than a predetermined value during adjustment of the intake air amount using the ABV 26, the degree of opening of the ABV 26 is set to a degree of opening on an open side while fixing the retard amount of the ignition timing.

Figure 3:
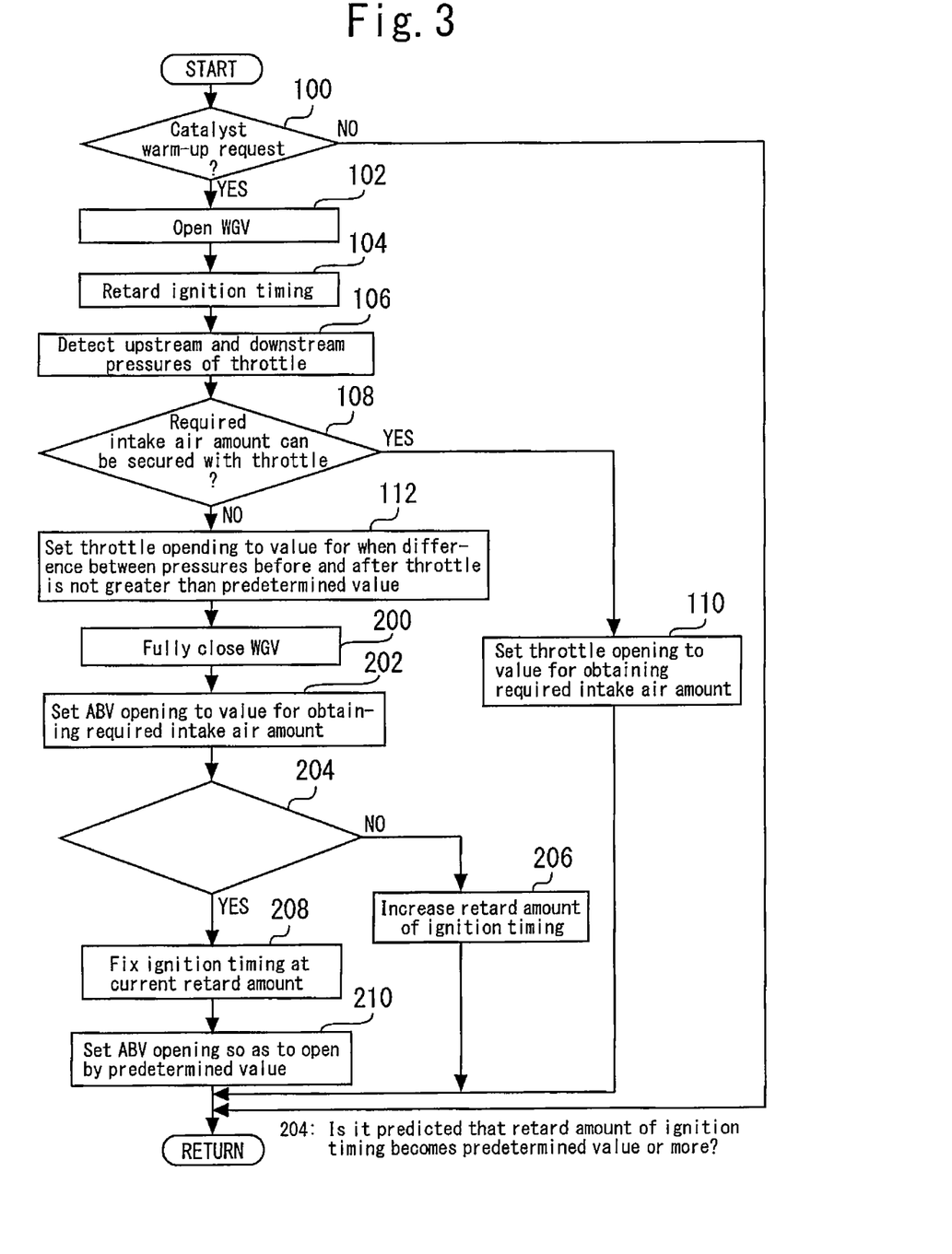
FIG. 3 is a flowchart of a routine that is executed in Embodiment 2 of the present invention.

FIG. 3 is a flowchart illustrating a control routine that the ECU 50 executes to realize catalyst warm-up control according to Embodiment 2 of the present invention. In FIG. 3, steps that are the same as steps shown in FIG. 2 according to Embodiment 1 are denoted by the same reference numerals, and a description of those steps is omitted or simplified.

In the routine illustrated in FIG. 3, similarly to the routine illustrated in the above described FIG. 2, if the result of the determination in step 108 is negative (that is, in a case where the sensitivity of control of the intake air amount by the throttle valve 30 is in a low state), the degree of opening of the throttle valve is set to a degree of opening that is used in a case where the above described differential pressure (difference between the intake pressures before and after the throttle valve 30) is less than or equal to a predetermined value in the aforementioned step 108.

Furthermore, in the routine illustrated in FIG. 3, next, the degree of opening of the WGV is set to a fully closed state (step 200). Next, the ABV degree of opening is set to a degree of opening at which the current required intake air amount is obtained under a condition of the degree of opening of the throttle valve and degree of opening of the WGV that were set in the aforementioned steps 112 and 200 (step 202). When the ABV 26 is opened in a state in which supercharging is being performed, a part of the intake air flowing through a section on the downstream side of the compressor 22a is returned to the upstream side of the compressor 22a through the intake bypass passage 24. As a result, the supercharging pressure decreases. Accordingly, by adjusting the ABV degree of opening toward a degree of opening on the open side, the intake air amount can be reduced since the supercharging pressure decreases, and conversely, by adjusting the ABV degree of opening toward a degree of opening on the closed side, the intake air amount can be increased since the supercharging pressure rises. Specifically, on the basis of maps (not illustrated in the drawings) based on the operating state which are included in the ECU 50, the relation between an amount of change in the ABV degree of opening and an amount of change in a supercharging pressure can be acquired, and an amount of change of the intake air amount can be acquired based on the amount of change in the supercharging pressure. Therefore, based on the relations in these maps, the ABV degree of opening that is required to ensure that the required intake air amount is obtained can be calculated.

Next, the ECU 50 determines whether or not it is predicted that the retard amount of the ignition timing is equal to or greater than a predetermined value (step 204). According to the catalyst warm-up control of the present embodiment, in a case where the degree of opening of the WGV was set to a fully closed state as in the aforementioned step 200 in a situation in which the sensitivity of control of the intake air amount by the throttle valve 30 is low, the retard amount of the ignition timing is gradually (by a predetermined amount at a time) increased by the processing in step 206, described later, to thereby compensate for the amount by which the energy introduced to the catalyst 38 decreases due to the degree of opening of the WGV being set to the fully closed state. As one example of the predetermined value in the present step 204, in this case, a limit value of the retard amount of the ignition timing from the viewpoint of suppressing combustion deterioration is used. That is, in the present step 204, it is determined whether or not the retard amount of the ignition timing will reach the retard limit amount from the viewpoint of suppressing combustion deterioration if retard of the ignition timing by the predetermined amount is further performed for the above described purpose.

If the result of the determination in the aforementioned step 204 is negative, that is, if it can be determined that there is still some margin in the retard amount of the ignition timing relative to the retard limit amount, the ignition timing is retarded by the predetermined amount (step 206). Note that the final target value of the retard amount of the ignition timing with respect to the processing in the present step 206 is a value in accordance with the state of the WGV 42. Specifically, in the present embodiment, a retard amount of the ignition timing that is necessary to compensate for the amount of a decrease in the energy introduced to the catalyst 38 due to fully closing the WGV 42 in the aforementioned step 200 corresponds to the final target value. On the other hand, if the result of the determination in the aforementioned step 204 is affirmative, that is, if it can be determined that the retard limit amount will be reached if retard of the ignition timing by the predetermined amount is performed this time, the ignition timing is fixed at the existing retard amount (step 208). Thereafter, the ABV degree of opening is set so as to open to a predetermined degree of opening (step 210).

According to the routine illustrated in FIG. 3 that is described above, in a case where the sensitivity of control of the intake air amount by the throttle valve 30 is in a high state when a catalyst warm-up request was issued, similar control to the routine illustrated in the above described FIG. 2 is performed. On the other hand, in a case where the sensitivity of control of the intake air amount by the throttle valve 30 is in a low state when a catalyst warm-up request was issued, the degree of opening of the throttle is fixed and the degree of opening of the WGV is set to a fully closed state, and thereafter, the intake air amount is adjusted by adjusting the degree of opening of the ABV 26. Further, in this case, the retard amount of the ignition timing is increased to compensate for the amount of decrease in energy introduced to the catalyst 38 accompanying closing of the WGV 42.

By performing the catalyst warm-up control of the present embodiment that is realized by the above described routine also, regardless of whether the atmospheric pressure is high or low, it is possible to secure an equal amount of energy that is introduced to the catalyst 38 while also ensuring the controllability of the intake air amount so that the required intake air amount is obtained. More specifically, if the vehicle is in a fast idling state after a cold startup, regardless of whether the atmospheric pressure is high or low, it is possible to secure an equal amount of energy that is introduced to the catalyst 38 while maintaining a predetermined fast idling speed. Therefore, according to the present catalyst warm-up control, warm-up performance with respect to the catalyst 38 can be favorably secured regardless of whether the atmospheric pressure is high or low.

Further, when using a turbo-supercharger in which the area of an opening portion of a WGV is large, if the intake air amount is controlled using the degree of opening of the WGV as in the above described method of Embodiment 1, the control resolution with respect to the flow rate of air passing through the WGV will decrease. Consequently, there is a possibility that adjustment of the intake air amount may be difficult due to an insufficient controllability with respect to the supercharging pressure. In contrast, by adjusting the intake air amount using the ABV 26 in a case where the sensitivity of control of the intake air amount by the throttle valve 30 is low, as in the method of the present embodiment, regardless of whether the atmospheric pressure is high or low, it is possible to secure an equal amount of energy that is introduced to the catalyst 38 while accurately adjusting the intake air amount.

Further, according to the above described routine, in a case where it is predicted that a retard amount of the ignition timing for compensating for a decrease in the energy introduced to the catalyst 38 caused by the degree of opening of the WGV being set in a fully closed state is equal to or greater than a predetermined value, the ignition timing is fixed at the retard amount at the time of the aforementioned prediction, and thereafter the ABV 26 is opened. If it is assumed for instance that a sufficient retard amount of the ignition timing was not secured when the WGV 42 was closed (according to the present embodiment, was fully closed) as described above, there is a concern that the warm-up performance of the catalyst 38 will decline and the purification performance of the catalyst 38 will decrease. In contrast, according to the processing of the present routine, because the intake air amount decreases when the ABV 26 is opened, although the fast idling speed decreases if the operating state is the fast idling state, the exhaust gas amount that is discharged from inside each cylinder decreases. Consequently, exhaust emissions released during warm-up of the catalyst 38 can be reduced. Accordingly, when compensating for a decrease in the amount of energy introduced to the catalyst 38 by retarding the ignition timing, it is possible to suppress a deterioration in the exhaust emission performance during warm-up due to an insufficient retard amount of the ignition timing.

In addition, according to the above described routine, control of the ABV 26 is executed after predicting in advance arrival at the retard limit amount of the ignition timing from the viewpoint of suppressing combustion deterioration. It is thereby possible to suppress a deterioration in the exhaust emission performance during warm-up due to an insufficient retard amount of the ignition timing, while more reliably avoiding a deterioration in combustion that is caused by increasing the retard amount of the ignition timing.

Incidentally, in the above described Embodiment 2, a configuration may also be adopted in which, in a case where the sensitivity of control of the intake air amount by the throttle valve 30 is in a low state, the WGV 42 is controlled to fully close. However, the degree of opening of the WGV that is controlled in this case is not necessarily limited to a fully closed state as long as the degree of opening of the WGV is a degree of opening on the closed side and, for example, may be a predetermined degree of opening in the vicinity of a fully closed state.

Note that, in the above described Embodiment 2, the "catalyst warm-up execution means" according to the aforementioned another aspect of the present invention is realized by the ECU 50 executing the aforementioned processing of steps 102 and 104; the "first intake air amount control means" according to the aforementioned another aspect of the present invention is realized by the ECU 50 executing the aforementioned processing of step 110 in a case where the result of the determination in the aforementioned step 108 is affirmative; the "second intake air amount control means" according to the another aspect of the present invention is realized by the ECU 50 executing the aforementioned processing of steps 200 and 202 in a case where the result of the determination in the aforementioned step 108 is negative; and the "ignition timing control means" according to the aforementioned another aspect of the present invention is realized by the ECU 50 executing the aforementioned processing of step 206 in a case where the result of the determination in the aforementioned step 204 is negative.

Further, in the above described Embodiment 2, the "air bypass valve control means" of the aforementioned another aspect of the present invention is realized by the ECU 50 executing the aforementioned processing of step 210 in a case where the result of the determination in the aforementioned step 204 is affirmative.

Embodiment 3

A system of the present embodiment can be realized by using the hardware configuration illustrated in FIG. 1 and causing the ECU 50 to execute the routine shown in FIG. 4, described later, instead of the routine shown in FIG. 2.

Figure 4:
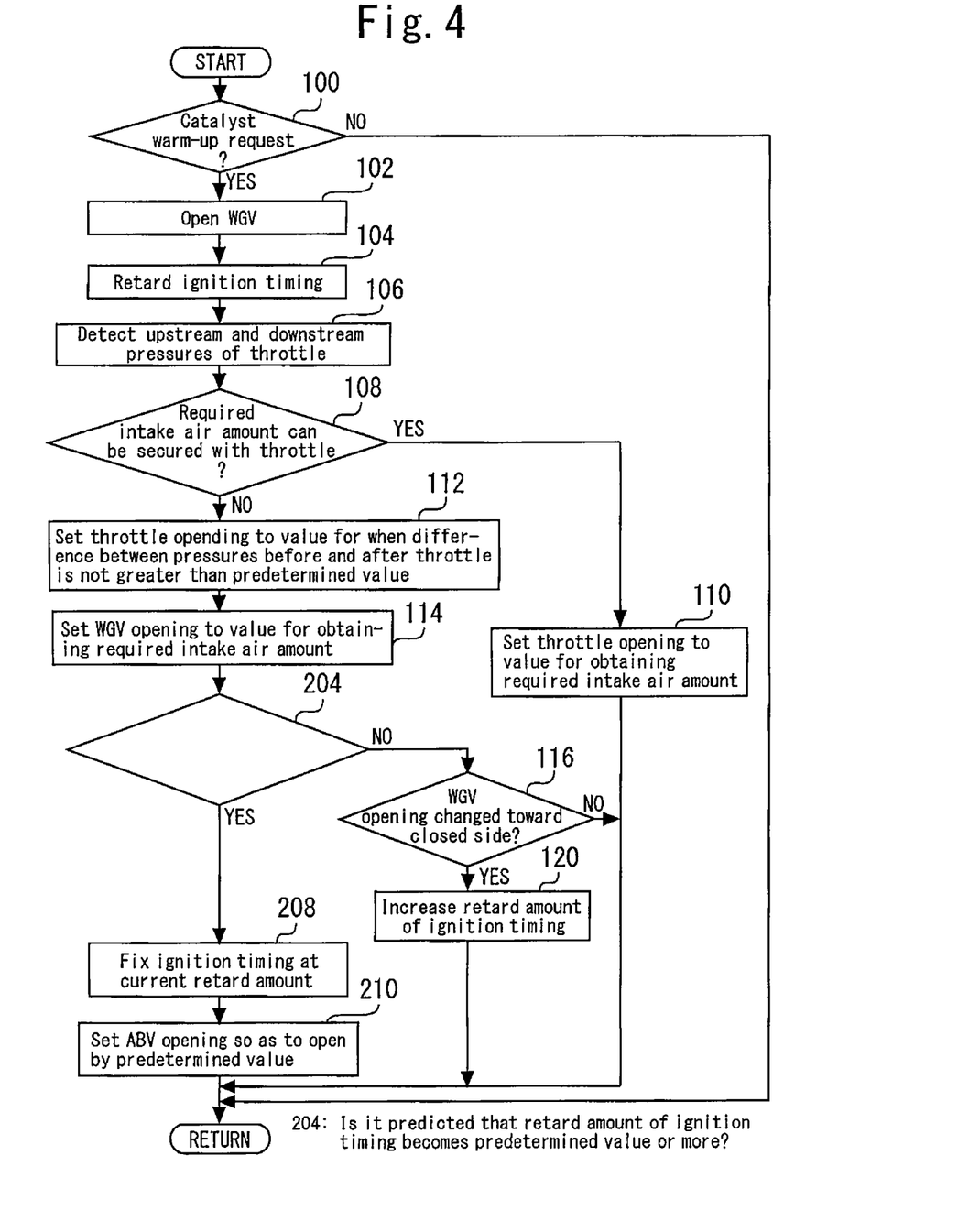
FIG. 4 is a flowchart of a routine that is executed in Embodiment 3 of the present invention.

FIG. 4 is a flowchart illustrating a control routine that the ECU 50 executes in order to realize catalyst warm-up control according to Embodiment 3 of the present invention. In FIG. 4, steps that are the same as steps shown in FIGS. 2 and 3 according to Embodiments 1 and 2 are denoted by the same reference numerals, and a description of those steps is omitted or simplified.

As shown in FIG. 4, the processing of the present routine is processing that combines the routine shown in FIG. 2 and the routine shown in FIG. 3. That is, processing that is executed when the sensitivity of control of the intake air amount by the throttle valve 30 is in a high state when a catalyst warm-up request is issued is the same as in the routines shown in FIGS. 2 and 3. In contrast, in a case where the sensitivity of control of the intake air amount by the throttle valve 30 is in a low state when a catalyst warm-up request is issued, similarly to the routine shown in FIG. 2, the intake air amount is adjusted by adjustment of the degree of opening of the WGV 42 while the degree of opening of the throttle valve is kept constant.

Moreover, according to the catalyst warm-up control of the present embodiment, during adjustment of the intake air amount using the WGV 42, in a case where it is not predicted that the retard amount of the ignition timing will reach a limit value of the retard amount of the ignition timing from the viewpoint of suppressing combustion deterioration, on the condition that the degree of opening of the WGV is being controlled toward the closed side (step 116), the retard amount of the ignition timing is increased (step 120). On the other hand, in a case where the aforementioned prediction is made, after fixing the retard amount of the ignition timing by the processing in the aforementioned step 208, the degree of opening of the ABV 26 is set to a degree of opening on the open side by the processing in the aforementioned step 210.

The warm-up performance with respect to the catalyst 38 can also be favorably secured by the catalyst warm-up control of the present embodiment that is realized by the routine shown in FIG. 4, regardless of whether the atmospheric pressure is high or low. Further, by means of the control of the ABV 26 in the present catalyst warm-up control, when retard of the ignition timing is utilized to compensate for an amount by which the energy introduced to the catalyst 38 decreases due to closing of the WGV 42, a deterioration in the exhaust emission performance that is caused by an insufficient retard amount of the ignition timing can be suppressed.

Note that, in the above described Embodiment 3, the "air bypass valve control means" according to the aforementioned one aspect of the present invention is realized by the ECU 50 executing the aforementioned processing of step 210 in a case where the result of the determination in the aforementioned step 204 is affirmative.

In Embodiments 1 to 3 that are described above, a configuration is adopted so as to determine whether the sensitivity of control of the intake air amount by the throttle valve 30 is in a high state or a low state based on whether or not the differential pressure between the throttle upstream pressure and the throttle downstream pressure is not less than or equal to a predetermined value. However, the aforementioned determination as to whether the control sensitivity is high or low is not limited to the aforementioned method. That is, for example, a configuration may also be adopted which further includes an atmospheric pressure sensor, and in which the aforementioned determination as to whether the control sensitivity is high or low is made in accordance with an atmospheric pressure detected by the atmospheric pressure sensor.

DESCRIPTION OF SYMBOLS

10 internal combustion engine
12 combustion chamber
14 intake passage
16 exhaust passage
18 air cleaner
20 air flow meter
22 turbo-supercharger
22a compressor of turbo-supercharger
22b turbine of turbo-supercharger
24 intake bypass passage
26 air bypass valve (ABV)
28 intercooler
30 throttle valve
31 throttle upstream pressure sensor
32 throttle downstream pressure sensor
34 fuel injection valve
36 ignition device
38 exhaust gas purifying catalyst
40 exhaust bypass passage
42 waste gate valve (WGV)
44 A/F sensor
46 $O_2$ sensor
48 crank angle sensor
50 Electronic Control Unit (ECU)
52 water temperature sensor
54 accelerator position sensor

The invention claimed is:

1. A control apparatus for an internal combustion engine that includes a turbo-supercharger and an exhaust gas purifying catalyst disposed in an exhaust passage on a downstream side of a turbine of the turbo-supercharger, the control apparatus comprising:
    a throttle valve that adjusts an intake air amount that is drawn into the internal combustion engine;
    an ignition device for igniting an air-fuel mixture in a cylinder of the internal combustion engine;
    an exhaust bypass passage that branches from the exhaust passage on an upstream side of the turbine, and merges again with the exhaust passage at a location between the turbine and the exhaust gas purifying catalyst;
    a waste gate valve that is capable of opening and closing the exhaust bypass passage; and
    an electronic control unit configured to
        execute a catalyst warm-up control that opens the waste gate valve and retards an ignition timing at a time of a catalyst warm-up request to warm up the exhaust gas purifying catalyst,
        in accordance with whether or not a difference between an upstream pressure and a downstream pressure of the throttle valve during execution of the catalyst warm-up control is equal to or less than a predetermined value, adjust an intake air amount control actuator to obtain a required intake air amount during execution of the catalyst warm-up control,
        select the throttle valve as the intake air amount control actuator when the difference is greater than the predetermined value, and select the waste gate valve as the intake air amount control actuator when the difference is equal to or less than the predetermined value, and
        increase a retard amount of an ignition timing when a degree of opening of the waste gate valve is controlled toward a closed side in a case where the waste gate valve is selected as the intake air amount control actuator.

2. The control apparatus for an internal combustion engine according to claim 1, further comprising:
    an intake bypass passage that branches from an intake passage on an upstream side of a compressor of the turbo-supercharger, and merges again with the intake passage at a location between the compressor and the throttle valve;
    an air bypass valve that opens and closes the intake bypass passage; and
    an air bypass valve control unit for increasing a degree of opening of the air bypass valve in a case where it is predicted that an amount of retard of the ignition timing will be equal to or greater than a predetermined value.

3. The control apparatus for an internal combustion engine according to claim 1,
    wherein the electronic control unit executes the catalyst warm-up control in a fast idling state after a cold startup of the internal combustion engine,
    wherein the electronic control unit is configured to control the throttle valve so that when the difference is not equal to or less than the predetermined value, the required intake air amount that is necessary for maintaining an engine speed at a predetermined speed at a time of the fast idling is obtained, and wherein the electronic control unit is configured to control the waste gate valve so that when the difference is equal to or less than the predetermined value, the required intake air amount that is necessary for maintaining an engine speed at the predetermined speed at the time of the fast idling is obtained.

4. An internal combustion engine system, comprising:
an internal combustion engine;
a turbo-supercharger; an
exhaust gas purifying catalyst disposed in an exhaust passage on a downstream side of a turbine of the turbo-supercharger;
a throttle valve that adjusts an intake air amount that is drawn into the internal combustion engine;
an ignition device for igniting an air-fuel mixture in a cylinder of the internal combustion engine;
an exhaust bypass passage that branches from the exhaust passage on an upstream side of the turbine, and merges again with the exhaust passage at a location between the turbine and the exhaust gas purifying catalyst;
a waste gate valve that is capable of opening and closing the exhaust bypass passage;
an intake bypass passage that branches from an intake passage on an upstream side of a compressor of the turbo-supercharger, and merges again with the intake passage at a location between the compressor and the throttle valve;
an air bypass valve that is capable of opening and closing the intake bypass passage; and
an electronic control unit configured to
execute a catalyst warm-up control that opens the waste gate valve and retards an ignition timing at a time of a catalyst warm-up request to warm up the exhaust gas purifying catalyst,
in accordance with whether or not a difference between an upstream pressure and a downstream pressure of the throttle valve during execution of the catalyst warm-up control is equal to or less than a predetermined value, adjust an intake air amount control actuator to obtain a required intake air amount during execution of the catalyst warm-up control,
select the throttle valve as the intake air amount control actuator when the difference is greater than the predetermined value, and select the air bypass valve as the intake air amount control actuator when the difference is equal to or less than the predetermined value,
control a degree of opening of the waste gate valve toward a closed side when the air bypass valve is being selected as the intake air amount control actuator; and
when the air bypass valve is being selected as the intake air amount control actuator, increase a retard amount of the ignition timing based on the degree of opening of the waste gate valve that is controlled toward the closed side.

5. The internal combustion engine system according to claim 4, wherein the electronic control unit is configured to increase a degree of opening of the air bypass valve when an amount of retard of the ignition timing is equal to or greater than a predetermined value.

6. The internal combustion engine system according to claim 4,
wherein the electronic control unit executes the catalyst warm-up control in a fast idling state after a cold startup of the internal combustion engine,
wherein the electronic control unit is configured to control the throttle valve so that when the difference is not equal to or less than the predetermined value, the required intake air amount that is necessary for maintaining an engine speed at a predetermined speed at a time of the fast idling is obtained, and
wherein the electronic control unit is configured to control the air bypass valve is controlled so that when the difference is equal to or less than the predetermined value, the required intake air amount that is necessary for maintaining the engine speed at the predetermined speed at the time of the fast idling is obtained.

7. The control apparatus for an internal combustion engine according to claim 1,
wherein the electronic control unit is configured to set a degree of opening of the throttle valve when the difference is equal to or less than the predetermined value.

8. The internal combustion engine system according to claim 1,
wherein the electronic control unit is configured to set a degree of opening of the throttle valve when the difference is equal to or less than the predetermined value.

* * * * *

UNITED STATES PATENT AND TRADEMARK OFFICE
CERTIFICATE OF CORRECTION

PATENT NO. : 9,890,718 B2
APPLICATION NO. : 14/363034
DATED : February 13, 2018
INVENTOR(S) : Takashi Tsunooka Page 1 of 1

It is certified that error appears in the above-identified patent and that said Letters Patent is hereby corrected as shown below:

In the Claims

Column 22, Line 41, replace "1" with "4".

Signed and Sealed this
Seventeenth Day of July, 2018

Andrei Iancu
*Director of the United States Patent and Trademark Office*